(12) United States Patent
Tinney

(10) Patent No.: US 11,803,723 B2
(45) Date of Patent: Oct. 31, 2023

(54) ELECTRONIC DISPLAY TAGS FOR TRACKING ELECTION EQUIPMENT

(71) Applicant: Hart InterCivic, Inc., Austin, TX (US)

(72) Inventor: Drew E. Tinney, Austin, TX (US)

(73) Assignee: Hart InterCivic, Inc., Austin, TX (US)

(*) Notice: Subject to any disclaimer, the term of this patent is extended or adjusted under 35 U.S.C. 154(b) by 25 days.

(21) Appl. No.: 17/693,891

(22) Filed: Mar. 14, 2022

(65) Prior Publication Data

US 2023/0289550 A1    Sep. 14, 2023

(51) Int. Cl.
*G06K 19/06*        (2006.01)
*G07C 13/00*        (2006.01)

(52) U.S. Cl.
CPC ....... *G06K 19/06037* (2013.01); *G07C 13/00* (2013.01)

(58) Field of Classification Search
CPC ....... G06K 19/06028; G06K 19/06037; G07C 13/00
USPC .......................... 235/51, 50 A, 386
See application file for complete search history.

(56) References Cited

U.S. PATENT DOCUMENTS

| | | | |
|---|---|---|---|
| 6,924,781 B1 * | 8/2005 | Gelbman | G06F 3/1454 340/8.1 |
| 7,791,489 B2 * | 9/2010 | Gelbman | G06K 17/0022 340/5.1 |
| 10,169,626 B2 | 1/2019 | Britt et al. | |
| 11,100,778 B2 | 8/2021 | Karhuketo | |
| 11,321,652 B1 * | 5/2022 | Mahmood | G06Q 10/06316 |
| 2001/0020935 A1 * | 9/2001 | Gelbman | G06K 19/07758 345/173 |
| 2002/0167500 A1 * | 11/2002 | Gelbman | G06K 19/07758 345/204 |
| 2005/0134461 A1 * | 6/2005 | Gelbman | G06K 7/10079 340/539.13 |
| 2006/0071925 A1 | 4/2006 | Wykoff et al. | |
| 2008/0297442 A1 * | 12/2008 | Gelbman | G09F 9/372 345/55 |
| 2008/0303637 A1 * | 12/2008 | Gelbman | G06K 19/0717 340/10.42 |

(Continued)

FOREIGN PATENT DOCUMENTS

| | | |
|---|---|---|
| WO | 0067110 | 11/2000 |
| WO | 02063602 | 8/2002 |

OTHER PUBLICATIONS

Panasonic Logiscend, "An Industrial IoT Solution", 2020, 6 pgs.

(Continued)

*Primary Examiner* — Paultep Savusdiphol
(74) *Attorney, Agent, or Firm* — Egan, Enders & Huston LLP.

(57) ABSTRACT

The present disclosure provides various embodiments of systems and methods of tracking information pertaining to assets, such as but not limited to, voting systems and other voting equipment used in an election (i.e., election equipment). In the present disclosure, a low-power electronic display tag (such as an electronic paper tag, or "e-paper" tag) is affixed to an asset to track information pertaining to that asset. Unlike conventional applications that utilize low-power electronic display tags (such as, e.g., asset tracking and ESL applications), the information displayed on the electronic display tag described herein is collected and dynamically updated by the asset being tracked.

22 Claims, 8 Drawing Sheets

(56) References Cited

U.S. PATENT DOCUMENTS

| | | | |
|---|---|---|---|
| 2009/0039169 A1* | 2/2009 | Gelbman | G09F 3/02 |
| | | | 235/492 |
| 2010/0225444 A1 | 9/2010 | Nobutsugu et al. | |
| 2012/0000974 A1* | 1/2012 | Hung | G06F 3/147 |
| | | | 235/375 |
| 2013/0168444 A1* | 7/2013 | Hsieh | G09G 3/001 |
| | | | 235/375 |
| 2015/0035674 A1* | 2/2015 | Karhuketo | G08B 13/2434 |
| | | | 340/568.1 |
| 2016/0263327 A1* | 9/2016 | Radmer | G16H 20/10 |
| 2016/0275873 A1* | 9/2016 | Taylor | G09G 3/34 |
| 2021/0077736 A1* | 3/2021 | Larsen | G09F 3/02 |
| 2021/0280287 A1* | 9/2021 | Mahmood | H04L 9/50 |
| 2022/0016353 A1* | 1/2022 | Toporek | A61M 5/31511 |
| 2022/0238061 A1* | 7/2022 | McDaniel | G09G 3/2092 |
| 2022/0300896 A1* | 9/2022 | Volkerink | G06K 19/06037 |
| 2022/0319446 A1* | 10/2022 | Ma | G09G 3/344 |
| 2022/0374807 A1* | 11/2022 | Mahmood | G16H 10/40 |
| 2023/0008898 A1* | 1/2023 | Tsai | G08B 13/2454 |

OTHER PUBLICATIONS

Solum Solution Provider, "The Newton Difference: Information Sharing", 2021, 4 pgs.
Pervasive Displays, "Designing E-Paper Displays for IoT Applications", Obtained From Internet Jan. 24, 2022, 2 pgs.
Pervasive Displays, "A Guide to E-Paper Technology and Its Growing Range of Applications", Obtained From Internet Mar. 3, 2022, 9 pgs.
Siemens, Data Sheet, Product Type Designation, 6GT2700-5DC05, Dec. 16, 2021, 2 pgs.
Siemens, Mobilize Products, Maximize Flexibility, Simatic RTLS, The Locating Platform for Your Digital Enterprise, 2020, 10 pgs.
Solum, "What are the Benefits of Electronic Shelf Labels in Tracking Industrial Equipment Location?", 2021, 8 pgs.

* cited by examiner

ELECTRONIC DISPLAY TAGS FOR TRACKING ELECTION EQUIPMENT

BACKGROUND OF THE INVENTION

The present disclosure relates to equipment used for elections. More specifically, it provides a system and method that uses electronic display tags to track information pertaining to voting systems and other voting equipment.

Elections may be conducted using a wide variety of voting systems. Examples of voting systems include, but are not limited to, hand counted paper ballot systems, optical scan paper ballot systems, direct recording electronic (DRE) systems, hybrid paper/electronic voting systems, etc. These voting systems are typically used at polling stations or other locations to receive a voter's vote selections, which may be hand-marked on a paper ballot or electronically generated within the voting system. In some cases, a voting system may print a paper vote record of the voter's vote selections and/or create an electronic cast vote record of the voter's vote selections after the voter reviews the and confirms the vote selections and casts their vote. A wide variety of other voting equipment may also be utilized at a polling location during an election. Examples of voting equipment typically found at a polling location include, but are not limited to, ballot marking devices, voting terminals, voter interface devices, accessibility interfaces, voter-verified paper trail (VVPAT) devices, tabulation devices, auditing devices, scanning devices, printing devices, etc. Voting systems and voting equipment may be collectively referred to herein as "election equipment."

A variety of information pertaining to election equipment may be tracked and recorded during each phase of the election cycle. Such information may include, for example, information about the identity, state, condition, history and/or chain of custody of the election equipment used in an election. Election officials are generally tasked with tracking and recording this information. Currently, election officials track information pertaining to election equipment manually with handwritten logs and/or paper tags affixed to the election equipment. These methods are labor intensive and prone to human error. In some cases, election officials may track this information by storing the information in an external inventory tracking system, which associates the information stored for each piece of election equipment with an equipment ID. This method is also labor intensive and prone to human error. As another disadvantage, the information stored within an external inventory tracking system is not readily displayed on the election equipment.

A need, therefore, exists for improved systems and methods of tracking information pertaining to assets, such as but not limited to, voting systems and other voting equipment (i.e., election equipment) used in elections.

SUMMARY OF THE INVENTION

The present disclosure provides various embodiments of systems and methods of tracking information pertaining to assets, such as but not limited to, voting systems and other voting equipment used in an election (i.e., election equipment). In the present disclosure, a low-power electronic display tag (such as an electronic paper tag, or "e-paper" tag) is affixed to an asset to track information pertaining to that asset. Unlike conventional applications that utilize low-power electronic display tags (e.g., asset tracking and ESL applications), the information displayed on the electronic display tag described herein is collected and dynamically updated by the asset being tracked.

In some embodiments, an electronic display tag may be affixed to election equipment to track information pertaining to the election equipment. More specifically, an electronic display tag may be affixed to an external surface of the election equipment, so that information displayed on the electronic display tag may be readily accessible to a user. In some embodiments, the electronic display tag affixed to the election equipment may be configured to display information relevant to a current phase of an election cycle. At least a portion of the information may be displayed in a human-readable format, so that the user may quickly ascertain the information by reading the information from the electronic display tag.

Election equipment goes through a variety of different usage phases in each election cycle. For example, an election cycle may typically include: a preparation phase, an election phase, a post-election phase and a storage phase. In the preparation phase, election equipment is in the process of being prepared for an upcoming election. This may include testing, cleaning and/or calibrating the election equipment to be used. In the election phase, election equipment is in the process of being used for voting. In the post-election phase, election equipment is being prepared for storage. This may include powering down election equipment, removing memory sticks, repairing broken election equipment, preparing election equipment for storage (e.g., by disassembling and/or securing election equipment), etc. Election equipment is stored in the storage phase.

During an election cycle, election equipment collects information pertaining to the election equipment during one or more phases of an election cycle, and dynamically updates the information displayed on the attached electronic display tag, as the election cycle progresses, so that the information displayed on the electronic display tag is relevant to a current phase of the election cycle. If the election equipment is in the process of being used in an election, for example, the election equipment collects information that is relevant to the election phase and dynamically updates the attached electronic display tag to display the information collected during the election phase. When the election cycle proceeds to the post-election phase, the election equipment collects information that is relevant to the post-election phase and dynamically updates the attached electronic display tag to display the information collected during the post-election phase. The process continues for each phase of the election cycle.

According to one embodiment, a system is provided herein including election equipment for use in an election, and an electronic display tag affixed to an external surface of the election equipment for displaying information pertaining to the election equipment, wherein the election equipment is configured to collect and dynamically update the information displayed on the electronic display tag. The electronic display tag may include a bi-stable display device. In one example, the electronic display tag may include an electronic paper (or "e-paper") display device. In some embodiments, at least a portion of the information displayed on the electronic display tag may be displayed in a human-readable format. In some embodiments, at least a portion of the information displayed on the electronic display tag may be displayed in a machine-readable format.

In some embodiments, the election equipment may be configured to collect the information pertaining to the election equipment during one or more phases of an election cycle. In such embodiments, the election equipment may be configured to dynamically update the information displayed on the electronic display tag, as the election cycle progresses, so that the information displayed on the electronic display tag is relevant to a current phase of the election cycle. In one particular embodiment, the election equipment may be configured to dynamically update the information displayed on the electronic display tag, as the election cycle progresses, so that the information displayed on the electronic display tag comprises: (a) preparation information during a preparation phase of the election cycle; (b) election information during an election phase of the election cycle; (c) post-election information during a post-election phase of the election cycle; and (d) storage information during a storage phase of the election cycle.

According to another embodiment, a system is provided herein including election equipment for use in an election and an electronic display tag, which is affixed to an external surface of the election equipment. The election equipment may be configured to collect information pertaining to the election equipment during one or more phases of an election cycle. The electronic display tag may include a low-power display device, which is configured to display a subset of the information collected by the election equipment. The low-power display device may be a bi-stable display device. In one example, the low-power display device may be an electronic paper (or "e-paper") display device. In some embodiments, at least a portion of the information displayed on the low-power display device may be displayed in a human-readable format. In some embodiments, at least a portion of the information displayed on the low-power display device may be displayed in a machine-readable format.

In some embodiments, the election equipment may be configured to dynamically update the subset of the information displayed on the low-power display device, as the election cycle progresses, so that the subset of the information displayed on the low-power display device is relevant to a current phase of the election cycle. For example, the election equipment may be configured to dynamically update the subset of the information displayed on the low-power display device, as the election cycle progresses, so that the subset of the information displayed on the low-power display device comprises: (a) preparation information during a preparation phase of the election cycle; (b) election information during an election phase of the election cycle; (c) post-election information during a post-election phase of the election cycle; and (d) storage information during a storage phase of the election cycle.

In some embodiments, the preparation information displayed on the low-power display device may include one or more of the following: a version of election software executed by the election equipment; a current election loaded in the election equipment; a polling location assigned to the election equipment; a date and time the election equipment was last calibrated; and a battery reading last recorded by the election equipment.

In some embodiments, the election information displayed on the low-power display device may include one or more of the following: a version of election software executed by the election equipment; a current election loaded in the election equipment; a polling location assigned to the election equipment; a date and time the polling location opened and closed; a number of ballots printed by the election equipment; any error states recorded by the election equipment; a date and time the election equipment was last used; and a battery reading last recorded by the election equipment.

In some embodiments, the post-election information displayed on the low-power display device may include one or more of the following: a version of election software executed by the election equipment; a current election loaded in the election equipment; a polling location assigned to the election equipment; a date and time the polling location closed at a conclusion of the election; a total number of ballots printed by the election equipment during the election; a hash of election results data recorded by the election equipment; any error states recorded by the election equipment during the election; a date and time the election equipment was last used; and a battery reading last recorded by the election equipment.

In some embodiments, the storage information displayed on the low-power display device may include one or more of the following: a version of election software executed by the election equipment; a last election in which the election equipment was last used; a polling location assigned to the election equipment during the last election; a total number of ballots printed by the election equipment during the last election; a hash of election results data recorded by the election equipment during the last election; any error states recorded by the election equipment during the last election; an indication of repairs needed and/or completed for the election equipment; a date and time the election equipment was last used; and a battery reading last recorded by the election equipment.

In some embodiments, the electronic display tag may include a first communication interface, and the election equipment may include a second communication interface, which is hardwired to the first communication interface for securely communicating the subset of the information to be displayed on the low-power display device.

In some embodiments, the election equipment may further include: a computer readable storage device configured to store program instructions; and a host processor configured to execute the program instructions to collect the information pertaining to the election equipment during the one or more phases of the election cycle, and dynamically update the subset of the information displayed on the low-power display device, as the election cycle progresses.

According to yet another embodiment, a method of tracking information pertaining to election equipment is provided herein. In some embodiments, the method may generally include: collecting information pertaining to the election equipment during one or more phases of an election cycle; displaying a subset of the information on an electronic display tag attached to the election equipment; and dynamically updating the subset of the information displayed on the electronic display tag, as the election cycle progresses, so that the subset of the information displayed on the electronic display tag is relevant to a current phase of the election cycle. In the method described herein, the steps of collecting information and dynamically updating the subset of the information may be performed by the election equipment.

In some embodiments, said dynamically updating the subset of the information displayed on the electronic display tag, as the election cycle progresses, may include dynamically updating the subset of the information displayed on the electronic display tag, so as to display: (a) preparation information on the electronic display tag during a preparation phase of the election cycle; (b) election information on the electronic display tag during an election phase of the election cycle; (c) post-election information on the electronic display tag during a post-election phase of the election cycle; and (d) storage information on the electronic display tag during a storage phase of the election cycle.

In some embodiments, the method may further include securely communicating the subset of the information from the election equipment to the electronic display tag via a hardwired connection.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DETAILED DESCRIPTION

Figure 1:
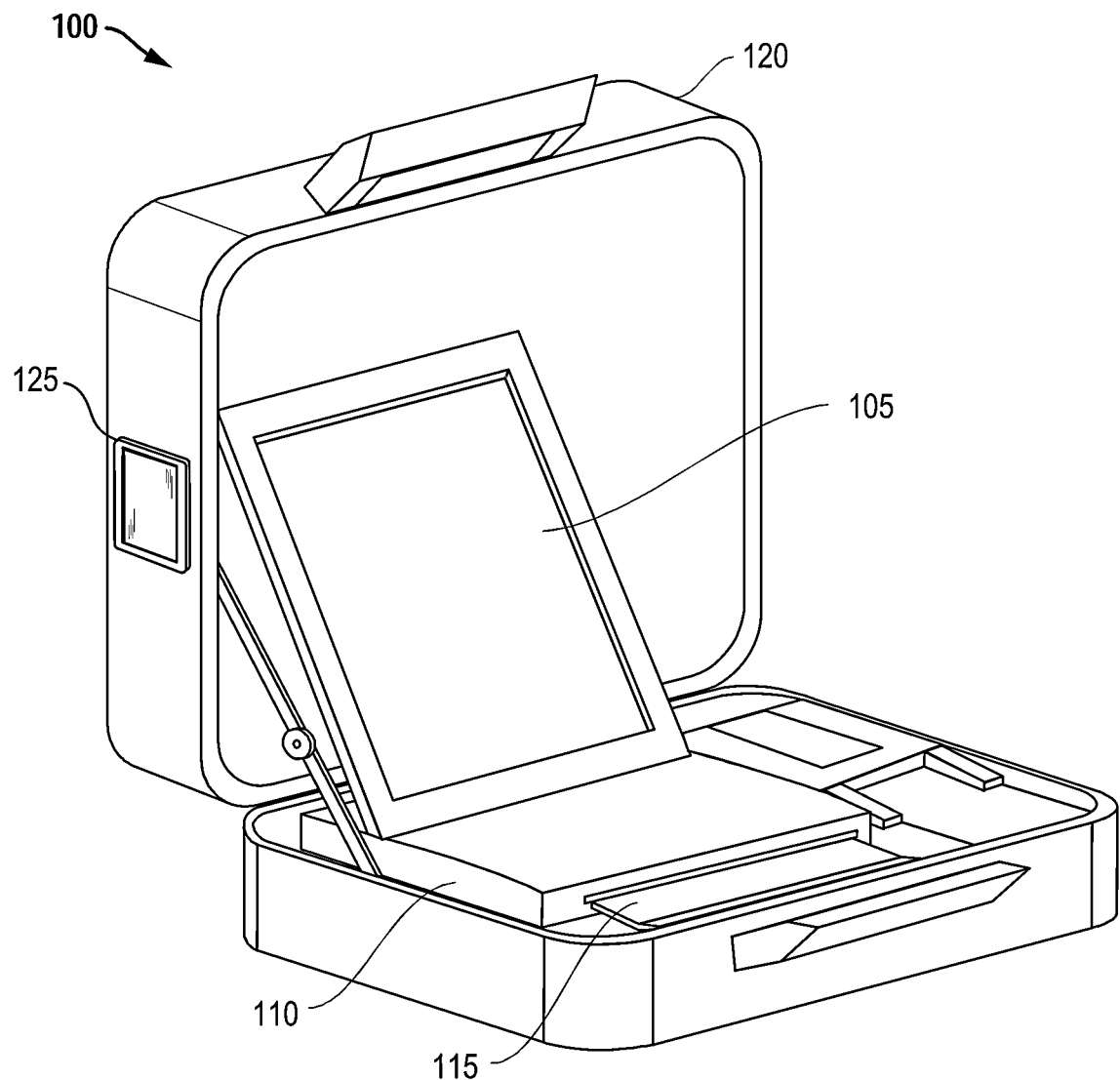
FIG. 1 is a perspective view of an example voting system having an electronic display tag affixed to an external surface of the voting system in accordance with one embodiment of the present disclosure.

Asset tracking is the process of tracking "assets" (e.g., parts, equipment, devices, containers, etc.) throughout a facility, geographical area or process. Traditionally, asset tracking has been performed using barcode printed paper labels and radio-frequency identification (RFID) tags, both of which may be read and/or written to using specialized scanners (e.g., optical or RF scanners). Although paper labels affixed to an asset may include information that can be read with the naked eye, as well as a scannable barcode, RFID tags cannot be read with the naked eye and require the use of an RF scanner to access and update data. For this reason, printed paper labels are still widely used in many different industries.

Recently, electronic paper tags, or "e-paper" tags, and labels have been utilized in asset tracking and electronic shelf label (ESL) applications to display information pertaining to tracked assets and merchandise. E-paper is a low-power electronic display technology that mimics the appearance of paper by combining the active-matrix thin-film transistor (TFT) technology used in liquid crystal displays (LCDs) with a layer of electronic ink. The electronic ink consists of millions of tiny capsules of electrically charged pigment particles (e.g., black and white) suspended between top and bottom electrodes. When appropriate charges are applied to the top and bottom electrodes, highly detailed images are formed on the e-paper display with the contrast and readability of traditional printed material.

E-paper displays are bi-stable, meaning that once an appropriate charge is applied to produce a particular image on the display screen, the visual state of each capsule (e.g., black or white) can be held without power. Since e-paper displays only consume power when updating the display screen, and retain images when power is off, e-paper displays consume very low power and are well-suited to applications with infrequent screen updates. This enables e-paper displays to be used in devices without the power budget of a traditional LCD display, or to create devices with long battery life.

The information displayed on e-paper displays utilized in asset tracking and ESL applications is typically managed and updated wirelessly via a centralized management system. When utilized in asset tracking applications, a centralized management system enables operators to track assets remotely, in real-time, and dynamically update the information displayed on the e-paper display screen to change process work flows as conditions change. In ESL applications, a remote operator (or store employee) may utilize a centralized management system to track merchandise inventory in real-time and dynamically update merchandise description and/or pricing displayed on one or more e-paper electronic shelf labels.

The present disclosure provides various embodiments of systems and methods of tracking information pertaining to assets, such as but not limited to, voting systems and other voting equipment used in an election (i.e., election equipment). In the present disclosure, a low-power electronic display tag (such as an e-paper display tag) is affixed to an asset to track information pertaining to that asset. Unlike conventional applications that utilize low-power electronic display tags (such as asset tracking and ESL applications), the information displayed on the electronic display tag described herein is collected and dynamically updated by the asset being tracked.

In some embodiments disclosed herein, an electronic display tag may be affixed to election equipment to track information pertaining to the election equipment. More specifically, an electronic display tag may be affixed to an external surface of the election equipment, so that information displayed on the electronic display tag may be readily accessible to a user. In some embodiments, the electronic display tag affixed to the election equipment may be configured to display information relevant to a current phase of an election cycle. At least a portion of the information may be displayed in a human-readable format, so that the user may quickly ascertain the information by reading the information from the electronic display tag.

Election equipment goes through a variety of different usage phases in each election cycle. For example, an election cycle may typically include: a preparation phase, an election phase, a post-election phase and a storage phase. In the preparation phase, election equipment is in the process of being prepared for an upcoming election. This may include testing, cleaning and/or calibrating the election equipment to be used. In the election phase, election equipment is in the process of being used for voting. In the post-election phase, election equipment is being prepared for storage. This may include powering down election equipment, removing memory sticks, repairing broken election equipment, preparing election equipment for storage (e.g., by disassembling and/or securing election equipment), etc. Election equipment is stored in the storage phase.

During an election cycle, election equipment collects information pertaining to the election equipment during one or more phases of an election cycle, and dynamically updates the information displayed on the attached electronic display tag, as the election cycle progresses, so that the information displayed on the electronic display tag is relevant to a current phase of the election cycle. If the election equipment is in the process of being used in an election, for example, the election equipment collects information that is relevant to the election phase and dynamically updates the attached electronic display tag to display the information collected during the election phase. When the election cycle proceeds to the post-election phase, the election equipment collects information that is relevant to the post-election phase and dynamically updates the attached electronic display tag to display the information collected during the post-election phase. The process continues for each phase of the election cycle.

FIG. 1 illustrates one example embodiment of election equipment that may be used during an election. More specifically, FIG. 1 illustrates an exemplary voting system 100 that may be utilized by a voter to input voting selections, review voting selections and cast a vote in an election. In the example embodiment shown in FIG. 1, voting system 100 is a ballot marking device (BMD). It is recognized, however, that the BMD shown in FIG. 1 is merely one example of election equipment that may utilize the techniques described herein to track information pertaining to the election equipment during each phase of an election cycle. Other types of election equipment, as well as other assets, can also utilize the techniques described herein.

The voting system 100 shown in FIG. 1 includes a display 105, a voting processing unit 110 and a printer medium input tray 115. The voting processing unit 110 may include a variety of hardware and software, including a memory, processors, associated election software, input/out (I/O) devices, etc., all as is known in the art. In operation, a voter may utilize the voting system 100 as part of the process of casting a vote in an election. The voter may be provided instructions and voting choices that are presented on the display 105 of the voting system 100. Various voter responses and election selections may be entered via the display (in the case of a touchscreen display) or may entered via other inputs, such as a keypad, buttons, dials, etc., that may be part of the voting processing unit 110. In some cases, the voting system 100 may include an internal printer (not shown), which may be utilized to print a voter's selections on a printed record (such as, e.g., a machine-marked paper ballot containing the voter's voting selections, a machine-marked summary ballot containing a summary of the voter's voting selections, etc.). In operation, a voter may use the voting system 100 to enter voting selections and generate a printed record of the voting selections, which may be reviewed by the voter before casting their vote. Once the vote is cast, an electronic cast vote record of the voter's selections is created and either temporarily stored within the voting system 100 or provided to a central election office for additional election processing.

During an election cycle, the voting system 100 shown in FIG. 1 may collect information relevant to each phase of the election cycle. During the preparation phase, for example, the voting system 100 may collect "preparation information," such as the election software version running on the voting system 100, the current election and/or the ballot configuration loaded in to the voting system 100, the polling location assigned to the voting system 100, the date/time the voting system 100 was last calibrated, the last battery reading recorded by the voting system 100, etc. During the election phase, the voting system 100 may collect "election information," such as the current election, the polling location where the voting system 100 is stationed, the date/time the polling location opened/closed, the number of ballots (or printed records) printed by the voting system 100, etc. During the post-election phase, the voting system 100 may collect "post-election information," such as the date/time the polling location closed at the conclusion of the election, the total number of ballots (or printed records) printed by the voting system 100 during the election, the last battery reading recorded by the voting system 100, information about any error states encountered, etc. In some embodiments, the voting system 100 may continue to collect "storage information" (such as current battery readings, etc.) during the storage phase of the election cycle. In other embodiments, the data collection performed by the voting system 100 may end at the post-election phase and may begin again at the preparation phase of the election cycle.

As shown in FIG. 1, an electronic display tag 125 is affixed to an external surface 120 of the voting system 100 for displaying information pertaining to the voting system 100. The information displayed on the electronic display tag 125 is preferably displayed in a human-readable format, so that a user may quickly ascertain the information by reading the information directly from the electronic display tag 125. In some embodiments, information may also be displayed on the electronic display tag 125 in a machine-readable format (such as, e.g., a barcode, QR code, etc.). Although shown in a particular location in FIG. 1, the electronic display tag 125 may be attached to any external surface 120 of the voting system 100, which is easily accessible to a user.

During each phase of an election cycle, the voting system 100 dynamically updates the electronic display tag 125 affixed to the external surface 120 to display a subset of the information collected by the voting system 100 that is relevant to the current phase of the election cycle. In other words, the electronic display tag 125 may be dynamically updated by the voting system 100, as the election cycle progresses, to display: (a) preparation information during the preparation phase, (b) election information during the election phase, (c) post-election information during the post-election phase and (d) storage information during the storage phase. In some embodiments, the post-election information collected by the voting system 100 during the post-election phase may be displayed on the electronic display tag 125 during the post-election phase and during the storage phase. If additional storage information is collected during the storage phase, the information displayed on the electronic display tag 125 during the post-election phase and the storage phase may be different.

Figure 2:
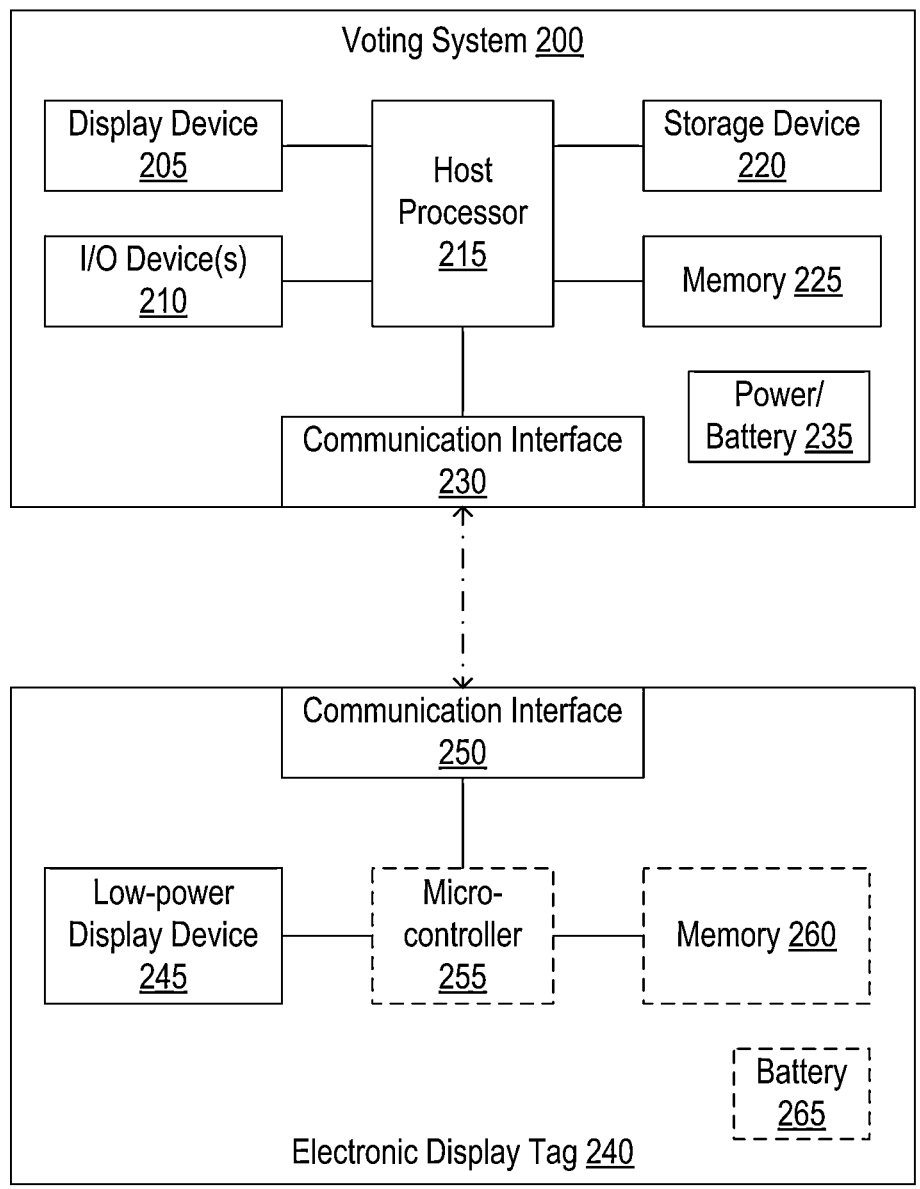
FIG. 2 is a block diagram illustrating various components included within a voting system and an electronic display tag in accordance with one embodiment of the present disclosure.

FIG. 2 is a block diagram illustrating various hardware components that may be included within a voting system 200 and an electronic display tag 240 in accordance with one embodiment of the present disclosure. In some embodiments, the hardware components included within the voting system 200 and the electronic display tag 240 shown in FIG. 2 may also be included within the voting system 100 and electronic display tag 125 shown in FIG. 1. It is recognized that other hardware/software components not shown herein may also be included. It is further recognized that although a particular voting system configuration is shown in FIG. 1, the hardware components illustrated in FIG. 2 may be included within other electronic equipment or other assets being tracked.

As shown in FIG. 2, the voting system 200 may generally include a display device 205, one or more I/O devices 210, a host processor 215, a computer readable storage device 220, a computer readable memory 225, a communication interface 230 and a power unit or battery 235. The display device 205 may be generally configured to display instructions and voting choices to a voter. The voter may utilize the display device 205 (in the case of a touchscreen display) or the one or more I/O devices 210 (e.g., a keypad, buttons, dials, etc.) to enter voter responses and voting selections. Once a voter's voting selections are entered and reviewed, the voter may utilize the display device 205 or the one or more I/O devices 210 to confirm their voting selections and cast their vote.

The voting system 200 collects information pertaining to the voting system 200 during one or more phases of the election cycle. This data collection may occur during times when the voting system 200 is being prepared for an election (i.e., during a preparation phase), used in an election (i.e., during an election phase), prepared for storage (i.e., during a post-election phase) and/or stored (i.e., during a storage phase). In some embodiments, program instructions stored within the computer readable storage device 220 may be executed by the host processor 215 to collect the information pertaining to the voting system during the one or more phases of the election cycle. Examples of information that may be collected during the various phases of an election cycle are disclosed above.

As shown in FIG. 2, the electronic display tag 240 may generally include a low-power display device 245 and a communication interface 250. In some embodiments, the electronic display tag 240 may include additional hardware components, such as a micro-controller 255, a memory 260 and/or a battery 265. It is noted, however, the micro-controller 255, memory 260 and battery 265 are optional components and may not be included in all embodiments.

The low-power display device 245 may include any low-power display device technology. In some embodiments, the low-power display device 245 may be a bi-stable display device. In one example embodiment, the low-power display device 245 may be an e-paper display device. The low-power display device 245 may be generally configured to display a subset of the information collected by the voting system 200. In some embodiments, the information displayed on the low-power display device 245 may be displayed in a human-readable format, so that a user may quickly ascertain the information by reading the information displayed on the low-power display device 245. In some embodiments, at least a portion of the information may be displayed on the low-power display device 245 in a machine-readable format (such as, e.g., a barcode, QR code, etc.).

In some embodiments, the program instructions stored within the computer readable storage device 220 may be further executed by the host processor 215 to dynamically update the subset of the information displayed on the low-power display device 245, as the election cycle progresses, so that the subset of the information displayed on the low-power display device 245 is relevant to a current phase of the election cycle. For example, the subset of the information displayed on the low-power display device 245 may be dynamically updated to display: (a) preparation information during a preparation phase of the election cycle, (b) election information during an election phase of the election cycle, (c) post-election information during a post-election phase of the election cycle, and/or (d) storage information during a storage phase of the election cycle.

Examples of information that may be displayed on the low-power display device 245 during each phase of an election cycle are shown in FIGS. 4-7 and described in more detail below.

As shown in FIG. 2, the voting system 200 includes a communication interface 230 which is communicatively coupled to the communication interface 250 included within the electronic display tag 240. In some embodiments, the communication interface 230 may be hardwired to the communication interface 250 for securely communicating information (e.g., the subset of the information to be displayed on the low-power display device 245) from the voting system 200 to the electronic display tag 240. For example, the communication interface 230 and the communication interface 250 may include connection pads or ports, which are coupled together via a single wire, multiple wires, a connector or any other hardwired connection where an electrical signal travels through a conductor. It is recognized that, although a hardwired connection may be preferred in voting and other data security sensitive applications, the communication interface 230 and the communication interface 250 may be alternatively coupled via a wireless connection. For example, the communication interface 230 and the communication interface 250 may comprise a Bluetooth, Wi-Fi or near field communication (NFC) wireless interface for receiving radio frequency (RF) signals over the air.

Figure 3:
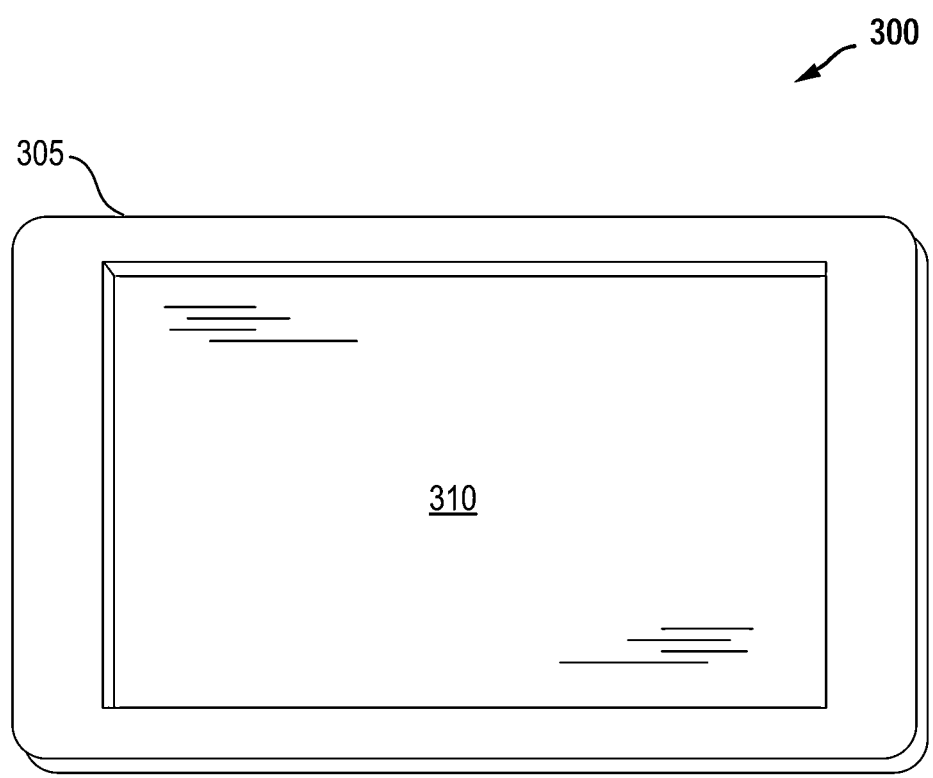
FIG. 3 is a perspective view of an electronic display tag in accordance with one embodiment of the present disclosure.

FIG. 3 illustrates an electronic display tag 300 in accordance with one embodiment of the present disclosure. As shown in FIG. 3, electronic display tag 300 includes a housing 305 and a low-power display device 310 (such as, e.g., an e-paper display device). In some embodiments, one or more of the hardware components shown in FIG. 2 (e.g., the communication interface 250, the micro-controller 255, the memory 260 and/or the battery 265) may be included within the housing 305.

Figure 4A:
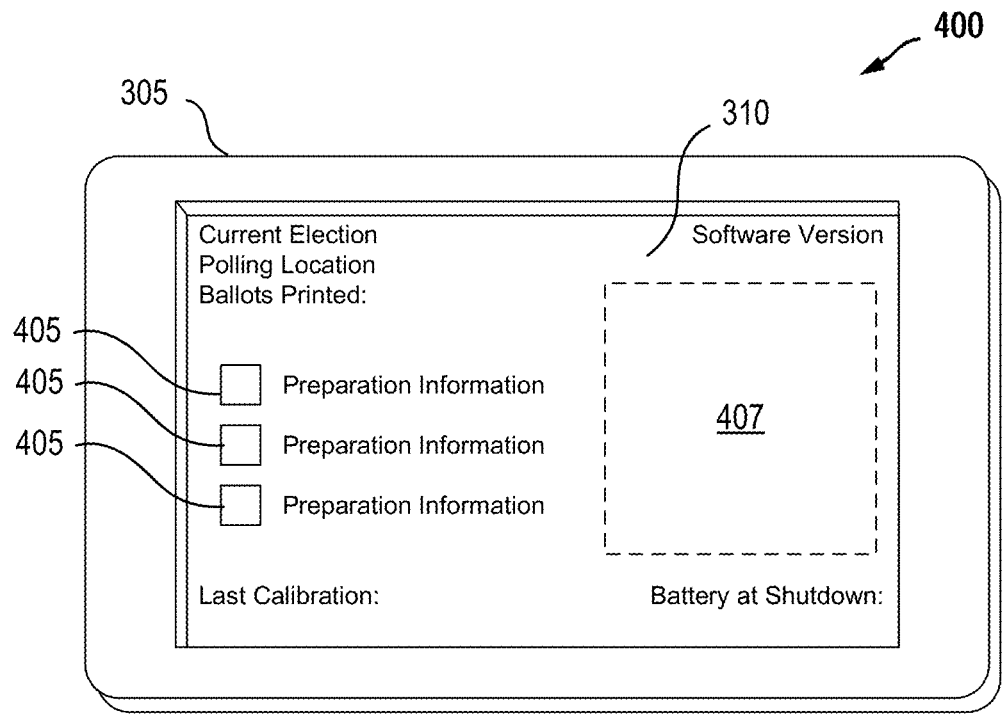
FIGS. 4A-4B illustrate examples of preparation information that may be displayed on the electronic display tag during a preparation phase of an election cycle.
Figure 4B:
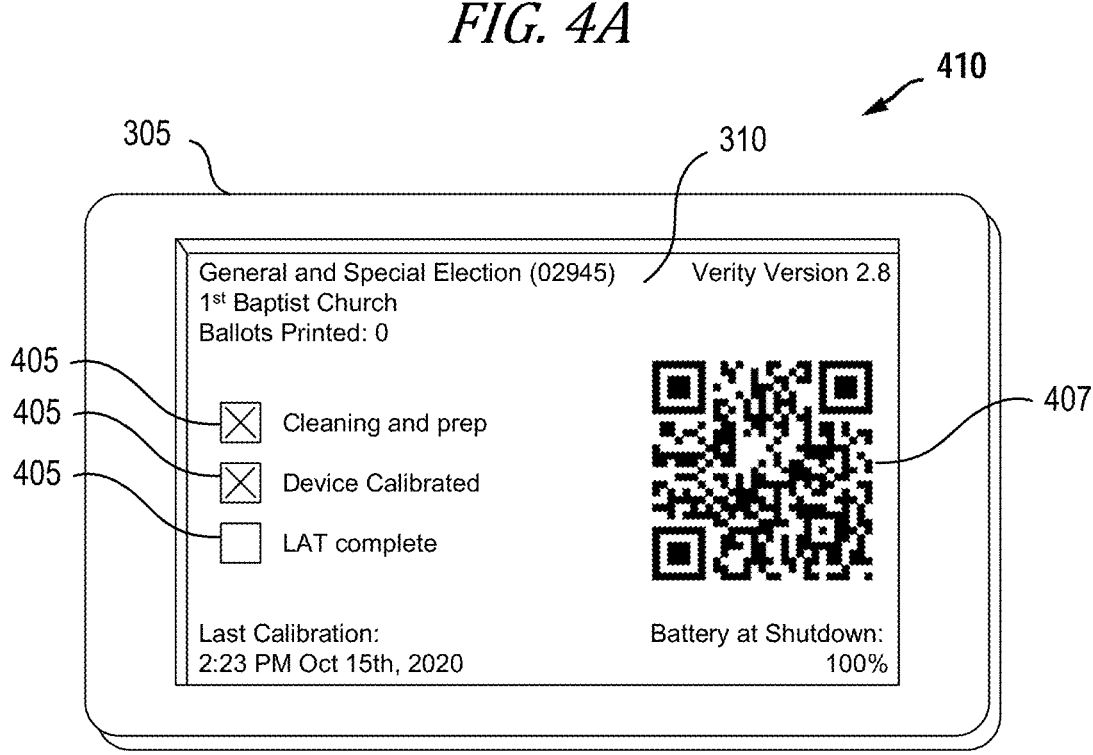

FIGS. 4A-4B illustrate examples of preparation information that may be displayed on the low-power display device 310 during a preparation phase of an election cycle. As shown in the embodiment 400 (see, FIG. 4A), the preparation information displayed on the low-power display device 310 may generally include: the current election loaded in the voting system ("Current Election"), the polling location assigned to the voting system ("Polling Location"), the number of ballots (or printed records) printed by the voting system ("Ballots Printed"), the date/time the voting system was last calibrated ("Last Calibration"), the last battery reading recorded by the voting system ("Battery at Shutdown"), and the election software version running on the voting system ("Software Version"). The preparation information displayed on the low-power display device 310 may also include a variety of other preparation information. In some embodiments, check boxes 405 may be displayed on the low-power display device 310 and used to indicate that a particular process has been performed to prepare the voting system for use. In some embodiments, an area 407 of the low-power display device 310 may be utilized for displaying images or information in a machine-readable format, which may be scanned to access the preparation information.

The embodiment 410 shown in FIG. 4B provides one example of preparation information that may be displayed on the low-power display device 310 during a preparation phase of an election cycle. The preparation information shown in FIG. 4B indicates that a voting system running the Verity Software Version 2.8 is being prepared for use in General and Special Election (02945) at the 1$^{st}$ Baptist Church polling location. No ballots (or printed records) have been printed by the voting system, since the voting system is in the preparation phase and the election has not yet begun. The preparation information shown in FIG. 4B further indicates that the voting system was last calibrated at 2:23 PM on Oct. 15, 2020, and the battery reading at shutdown was 100%. The check boxes 405 displayed on the low-power display device 310 indicate that cleaning, preparation and device calibration have been performed, but logic and accuracy testing (LAT) has not yet been completed. A QR code of the preparation information shown in FIG. 4B is displayed in area 407 of the low-power display device 310.

Figure 5A:
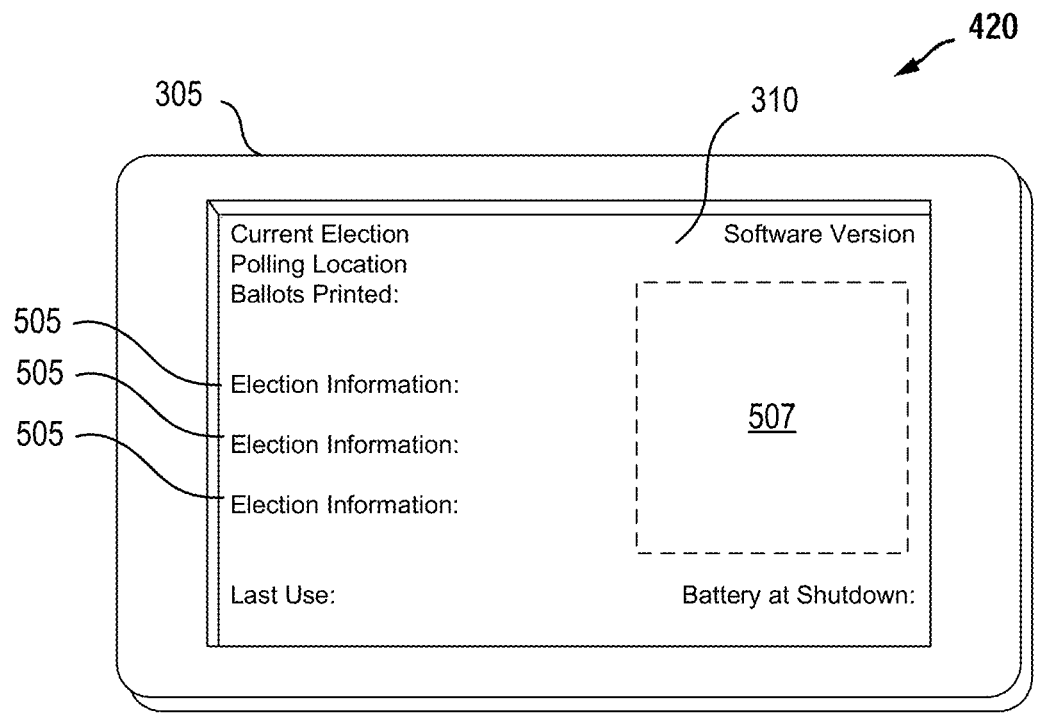
FIGS. 5A-5B illustrate examples of election information that may be displayed on the electronic display tag during an election phase of an election cycle.
Figure 5B:
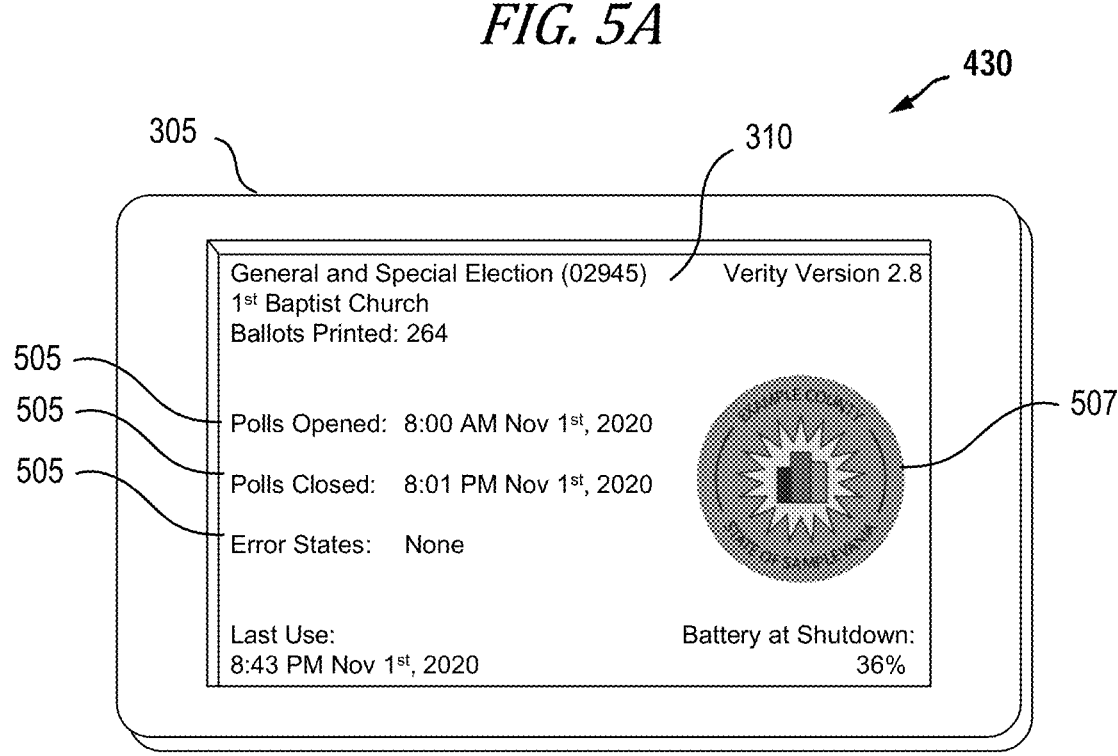

FIGS. 5A-5B illustrate examples of election information that may be displayed on the low-power display device 310 during an election phase of an election cycle. As shown in the embodiment 420 (see, FIG. 5A), the election information displayed on the low-power display device 310 may generally include: the current election loaded in the voting system ("Current Election"), the polling location assigned to the voting system ("Polling Location"), the number of ballots (or printed records) printed by the voting system ("Ballots Printed"), the date/time the voting system was last used ("Last Use"), the last battery reading recorded by the voting system ("Battery at Shutdown"), and the election software version running on the voting system ("Software Version"). The election information displayed on the low-power display device 310 may also include a variety of other election information 505, such as the date/time the polling location opened/closed and any error states recorded by the voting system. In some embodiments, an area 507 of the low-power display device 310 may be utilized for displaying images or information in a machine-readable format, which may be scanned to access the election information.

The embodiment 430 shown in FIG. 5B provides one example of election information that may be displayed on the low-power display device 310 during an election phase of an election cycle. The election information shown in FIG. 5B indicates that a voting system running the Verity Software Version 2.8 is currently being used in General and Special Election (02945) at the 1$^{st}$ Baptist Church polling location. The election information 505 displayed on the low-power display device 310 further indicates that the 1$^{st}$ Baptist Church polling location opened at 8:00 AM and closed at 8:01 PM on Nov. 1, 2020. At the time the polls closed, the voting system had printed a total of two-hundred and sixty-four (264) ballots (or printed records). No error states were recorded by the voting system. The election information further indicates that the voting system was last used at 8:43 PM on Nov. 1, 2020, and the battery reading at shutdown was 36%. An image of an Example County is displayed in area 507 of the low-power display device 310 to represent the county in which the election is conducted.

Figure 6A:
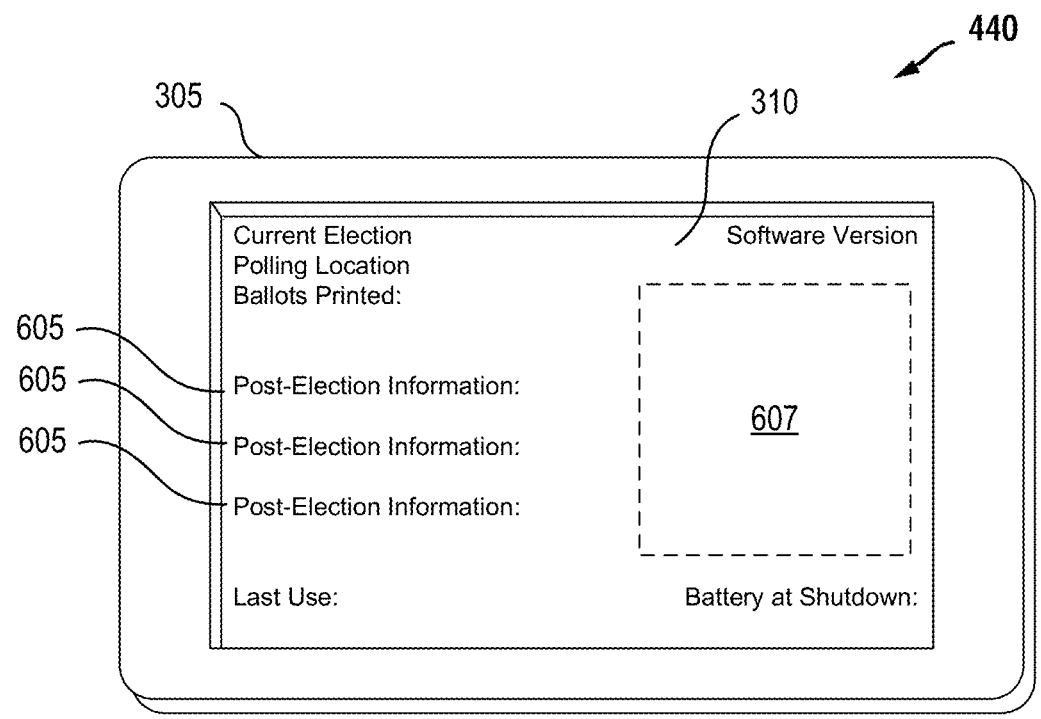
FIGS. 6A-6B illustrate examples of post-election information that may be displayed on the electronic display tag during a post-election phase of an election cycle.
Figure 6B:
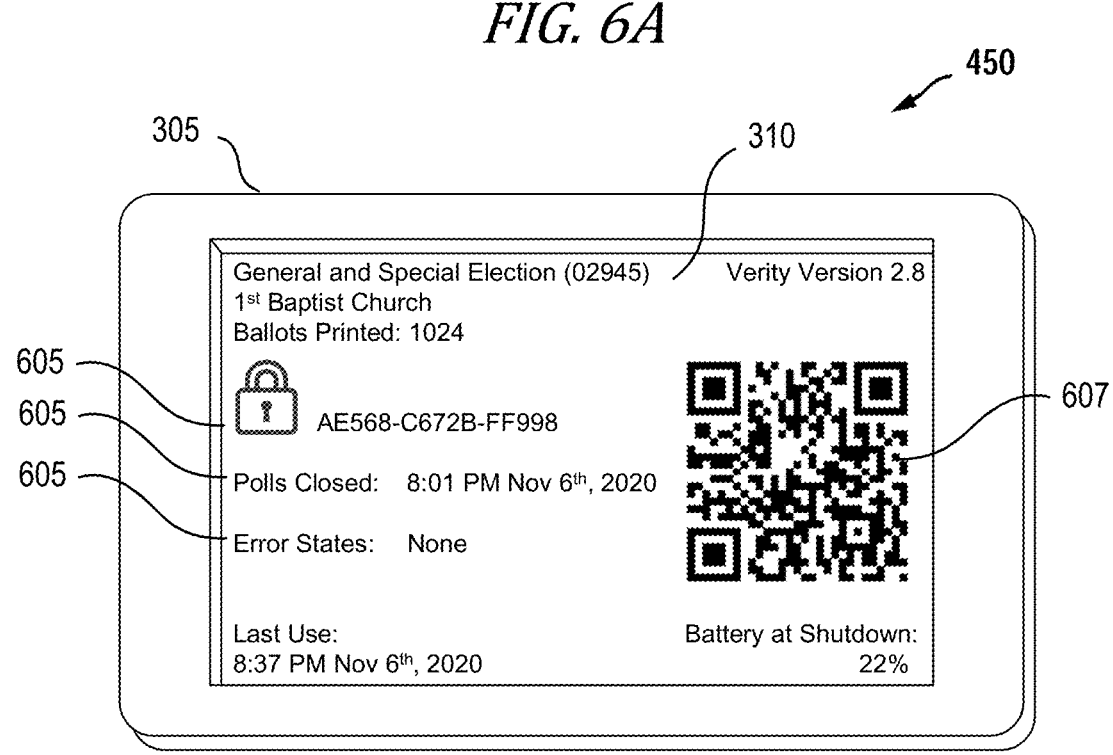

FIGS. 6A-6B illustrate examples of post-election information that may be displayed on the low-power display device 310 during a post-election phase of an election cycle. As shown in the embodiment 440 (see, FIG. 6A), the post-election information displayed on the low-power display device 310 may generally include: the current election loaded in the voting system ("Current Election"), the polling location assigned to the voting system ("Polling Location"), the number of ballots (or printed records) printed by the voting system ("Ballots Printed"), the date/time the voting system was last used ("Last Use"), the last battery reading recorded by the voting system ("Battery at Shutdown"), and the election software version running on the voting system ("Software Version"). The post-election information displayed on the low-power display device 310 may also include a variety of other post-election information 605, such as a hash of the election results data, the date/time the polling location closed at the conclusion of the election and any error states recorded by the voting system during the election. In some embodiments, an area 607 of the low-power display device 310 may be utilized for displaying images or information in a machine-readable format, which may be scanned to access the post-election information.

The embodiment 450 shown in FIG. 6B provides one example of post-election information that may be displayed on the low-power display device 310 during a post-election phase of an election cycle. The post-election information shown in FIG. 6B indicates that a voting system running the Verity Software Version 2.8 was used in General and Special Election (02945) at the 1$^{st}$ Baptist Church polling location. The post-election information 605 displayed on the low-power display device 310 further indicates that the 1$^{st}$ Baptist Church polling location closed at 8:01 PM on Nov. 6, 2020. At the time the polls closed, the voting system had printed a total of one thousand and twenty-four (1024) ballots (or printed records). No error states ("none") were recorded by the voting system. A hash (e.g., AE568-C672B-FF998) of the election results data recorded by the voting system is displayed on the low-power display device 310 to improve security. The hash may be generated before the election results data is transported to a central election office, and may be verified upon arrival to provide an additional layer of tamper evidence to protect the data in transport. The post-election information further indicates that the voting system was last used at 8:37 PM on Nov. 6, 2020, and the battery reading at shutdown was 22%. A QR code of the post-election information shown in FIG. 6B is displayed in area 607 of the low-power display device 310.

In some embodiments, the post-election information collected by the voting system during the post-election phase (see, FIGS. 6A and 6B) may be displayed on the low-power display device 310 during the post-election phase and during the storage phase. If additional storage information is collected during the storage phase, the information displayed on the low-power display device 310 during the post-election phase and the storage phase may be different.

Figure 7A:
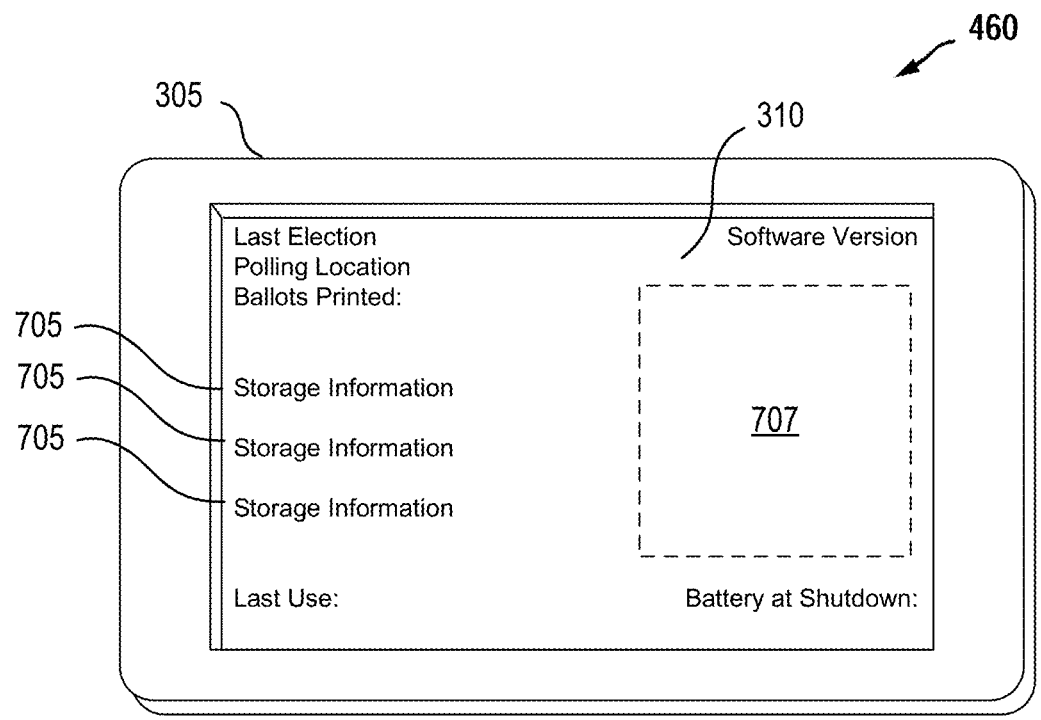
FIGS. 7A-7B illustrate examples of storage information that may be displayed on the electronic display tag during a storage phase of an election cycle.
Figure 7B:
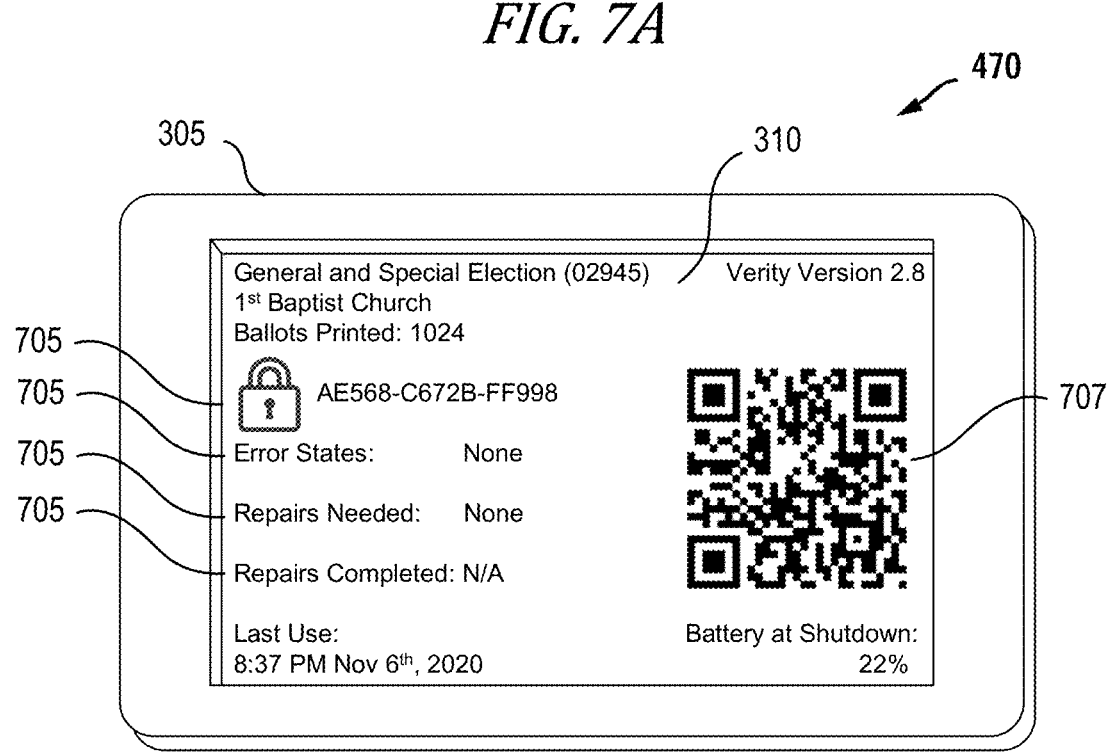

FIGS. 7A-7B illustrate examples of storage information that may be displayed on the low-power display device 310 during a storage phase of an election cycle. As shown in the embodiment 460 (see, FIG. 7A), the storage information displayed on the low-power display device 310 may include information, such as: the last election ("Last Election") and polling location ("Polling Location") in which the voting system was used, the election software version running on the voting system during the last election ("Software Version"), the number of ballots (or printed records) printed by the voting system in the last election ("Ballots Printed"), the date/time the voting system was last used ("Last Use") and the last battery reading recorded by the voting system ("Battery at Shutdown"). The storage information displayed on the low-power display device 310 may also include a variety of other storage information 705, such as but not limited to, a hash of the election results data recorded during the last election, any error states recorded by the voting system during the last election and an indication of any repairs needed and/or completed for the voting system. In some embodiments, an area 707 of the low-power display device 310 may be utilized for displaying images or information in a machine-readable format, which may be scanned to access the storage information.

The embodiment 470 shown in FIG. 7B provides one example of storage information that may be displayed on the low-power display device 310 during a storage phase of an election cycle. The storage information shown in FIG. 7B indicates that a voting system running the Verity Software Version 2.8 was last used in the General and Special Election (02945) at the 1$^{st}$ Baptist Church polling location. The hash of the election results data (e.g., AE568-C672B-FF998), which was generated by the voting system before the data was transported to the central election office, may also be displayed on the low-power display device 310 during the storage phase, as shown in FIG. 7B. In some cases, the last election, polling location and/or hash of the election results may be useful when auditing election results. Displaying this information on the low-power display device 310 during the storage phase of an election cycle may make it easier to find particular voting systems in an audit.

The storage information 705 displayed on the low-power display device 310 further indicates the voting system printed a total of one thousand and twenty-four (1024) ballots (or printed records) and recorded no error states ("none") during the last election. The storage information 705 also indicates that no repairs to the voting system are needed ("none") or completed ("N/A"). Finally, the storage information 705 indicates that the voting system was last used at 8:37 PM on Nov. 6, 2020, and the battery reading at shutdown was 22%. A QR code of the storage information shown in FIG. 7B is displayed in area 707 of the low-power display device 310.

Figure 8:
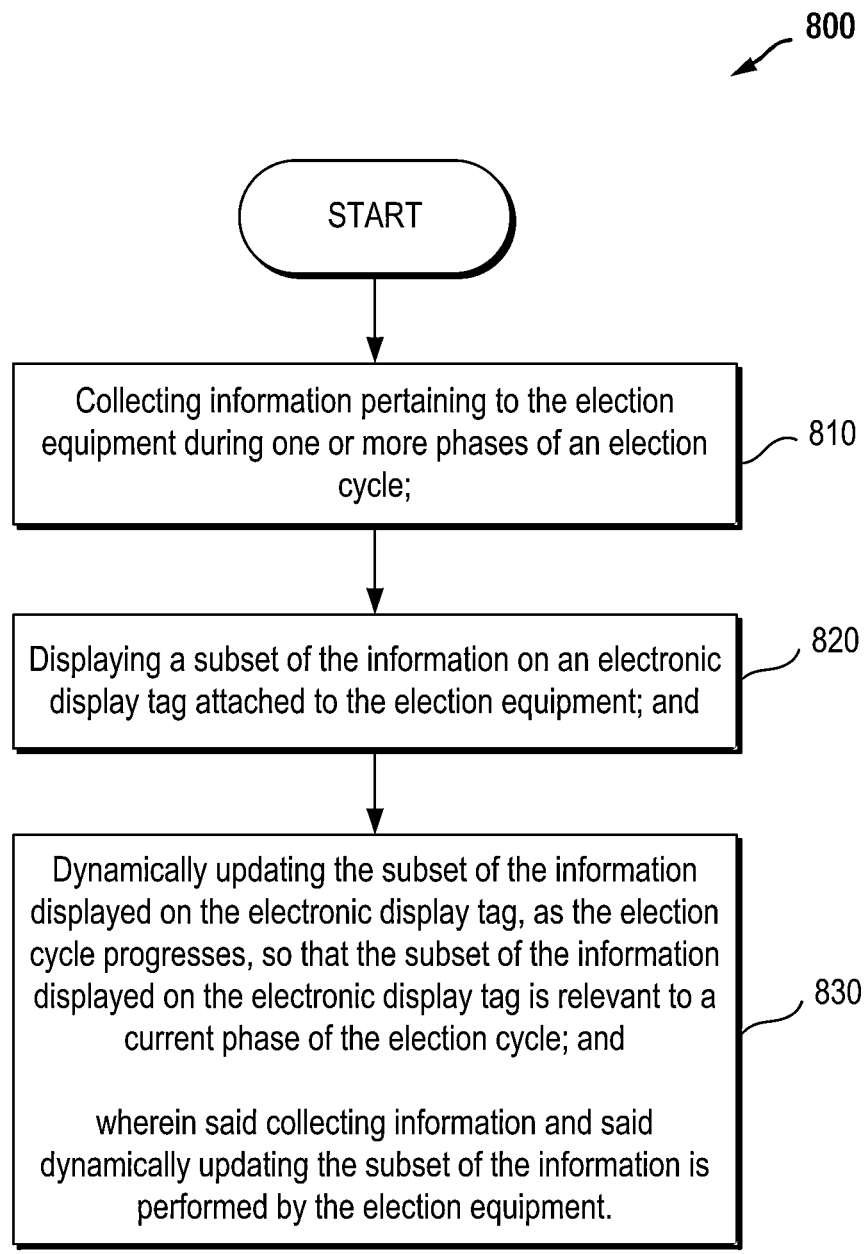
FIG. 8 is a flowchart diagram illustrating a method of tracking information pertaining to election equipment in accordance with one embodiment of the present disclosure.

FIG. 8 illustrates one embodiment of a method of tracking information pertaining to election equipment in accordance with the present disclosure. The method 800 shown in FIG. 8 utilizes election equipment and electronic display tags. Examples of election equipment and electronic display tags that may be used in method 800 are shown in FIGS. 1-7 and described above. Although example configurations are provided herein, one skilled in the art having the benefit of this disclosure would understand how other configurations of election equipment and electronic display tags may also be used in method 800.

It will be recognized that the embodiment shown in FIG. 8 is exemplary and additional methods may utilize the techniques described herein. Further, additional steps may be added to the method shown in the FIG. 8 as the steps described are not intended to be exclusive. Moreover, the order of the steps is not limited to the order shown in FIG. 8 as different orders may occur and/or various steps may be performed in combination or at the same time.

The method 800 shown in FIG. 8 may generally include collecting information pertaining to the election equipment during one or more phases of an election cycle (in step 810); displaying a subset of the information on an electronic display tag attached to the election equipment (in step 820); and dynamically updating the subset of the information displayed on the electronic display tag, as the election cycle progresses, so that the subset of the information displayed on the electronic display tag is relevant to a current phase of the election cycle (in step 830). In the method 800 shown in FIG. 8, the step 810 of collecting information and the step 830 of dynamically updating the subset of the information are performed by the election equipment. In some embodiments (not shown in FIG. 8), the method 800 may further include securely communicating the subset of the information from the election equipment to the electronic display tag via a hardwired connection.

In some embodiments, the step 830 of dynamically updating the subset of the information displayed on the electronic display tag, as the election cycle progresses, may include dynamically updating the subset of the information displayed on the electronic display tag, so as to display: a) preparation information on the electronic display tag during a preparation phase of the election cycle; b) election information on the electronic display tag during an election phase of the election cycle; c) post-election information on the electronic display tag during a post-election phase of the election cycle; and/or d) storage information on the electronic display tag during a storage phase of the election cycle.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms and methods of the invention herein shown and described are to be taken as presently preferred embodiments. Equivalent techniques may be substituted for those illustrated and described herein and certain features of the invention may be utilized independently of the use of other features, all as would be apparent to one skilled in the art after having the benefit of this description of the invention.

What is claimed:

1. A system, comprising:
   election equipment for use in an election, wherein the election equipment is configured to collect information pertaining to the election equipment; and
   an electronic display tag affixed to an external surface of the election equipment for displaying the information pertaining to the election equipment on the electronic display tag;
   wherein the election equipment is further configured to dynamically update the information displayed on the electronic display tag as the information pertaining to the election equipment is collected by the election equipment.

2. The system of claim 1, wherein at least a portion of the information displayed on the electronic display tag is displayed in a human-readable format.

3. The system of claim 1, wherein at least a portion of the information displayed on the electronic display tag is displayed in a machine-readable format.

4. The system of claim 1, wherein the electronic display tag comprises a bi-stable display device.

5. The system of claim 1, wherein the electronic display tag comprises an e-paper display device.

6. The system of claim 1, wherein the election equipment is configured to collect the information pertaining to the election equipment during one or more phases of an election cycle, and wherein the election equipment is configured to dynamically update the information displayed on the electronic display tag, as the election cycle progresses, so that the information displayed on the electronic display tag is relevant to a current phase of the election cycle.

7. The system of claim 6, wherein the election equipment is configured to dynamically update the information displayed on the electronic display tag, as the election cycle progresses, so that the information displayed on the electronic display tag comprises:
   preparation information during a preparation phase of the election cycle;
   election information during an election phase of the election cycle;
   post-election information during a post-election phase of the election cycle; and
   storage information during a storage phase of the election cycle.

8. A system, comprising:
election equipment for use in an election, wherein the election equipment is configured to collect information pertaining to the election equipment during one or more phases of an election cycle; and
an electronic display tag affixed to an external surface of the election equipment, the electronic display tag comprising a low-power display device configured to display a subset of the information collected by the election equipment;
wherein the election equipment is configured to dynamically update the subset of the information displayed on the low-power display device, as the election cycle progresses, so that the subset of the information displayed on the low-power display device is relevant to a current phase of the election cycle.

9. The system of claim 8, wherein at least a portion of the information displayed on the low-power display device is displayed in a human-readable format.

10. The system of claim 8, wherein at least a portion of the information displayed on the low-power display device is displayed in a machine-readable format.

11. The system of claim 8, wherein the low-power display device is a bi-stable display device.

12. The system of claim 8, wherein the low-power display device is an e-paper display device.

13. The system of claim 8, wherein the election equipment is configured to dynamically update the subset of the information displayed on the low-power display device, as the election cycle progresses, so that the subset of the information displayed on the low-power display device comprises:
preparation information during a preparation phase of the election cycle;
election information during an election phase of the election cycle;
post-election information during a post-election phase of the election cycle; and
storage information during a storage phase of the election cycle.

14. The system of claim 13, wherein the preparation information comprises one or more of the following:
a version of election software executed by the election equipment;
a current election loaded in the election equipment;
a polling location assigned to the election equipment;
a date and time the election equipment was last calibrated; and
a battery reading last recorded by the election equipment.

15. The system of claim 13, wherein the election information comprises one or more of the following:
a version of election software executed by the election equipment;
a current election loaded in the election equipment;
a polling location assigned to the election equipment;
a date and time the polling location opened and closed;
a number of ballots printed by the election equipment;
any error states recorded by the election equipment;
a date and time the election equipment was last used; and
a battery reading last recorded by the election equipment.

16. The system of claim 13, wherein the post-election information comprises one or more of the following:
a version of election software executed by the election equipment;
a current election loaded in the election equipment;
a polling location assigned to the election equipment;
a date and time the polling location closed at a conclusion of the election;
a total number of ballots printed by the election equipment during the election;
a hash of election results data recorded by the election equipment;
any error states recorded by the election equipment during the election;
a date and time the election equipment was last used; and
a battery reading last recorded by the election equipment.

17. The system of claim 13, wherein the storage information comprises one or more of the following:
a version of election software executed by the election equipment;
a last election in which the election equipment was last used;
a polling location assigned to the election equipment during the last election;
a total number of ballots printed by the election equipment during the last election;
a hash of election results data recorded by the election equipment during the last election;
any error states recorded by the election equipment during the last election;
an indication of repairs needed and/or completed for the election equipment;
a date and time the election equipment was last used; and
a battery reading last recorded by the election equipment.

18. The system of claim 8, wherein the electronic display tag comprises a first communication interface, and wherein the election equipment comprises a second communication interface, which is hardwired to the first communication interface for securely communicating the subset of the information to be displayed on the low-power display device.

19. The system of claim 8, wherein the election equipment comprises:
a computer readable storage device configured to store program instructions; and
a host processor configured to execute the program instructions to collect the information pertaining to the election equipment during the one or more phases of the election cycle, and dynamically update the subset of the information displayed on the low-power display device, as the election cycle progresses.

20. A method of tracking information pertaining to election equipment, the method comprising:
collecting information pertaining to the election equipment during one or more phases of an election cycle;
displaying a subset of the information on an electronic display tag attached to the election equipment; and
dynamically updating the subset of the information displayed on the electronic display tag, as the election cycle progresses, so that the subset of the information displayed on the electronic display tag is relevant to a current phase of the election cycle; and
wherein said collecting information and said dynamically updating the subset of the information is performed by the election equipment.

21. The method of claim 20, wherein said dynamically updating the subset of the information displayed on the electronic display tag, as the election cycle progresses, comprises dynamically updating the subset of the information displayed on the electronic display tag, so as to display:
preparation information on the electronic display tag during a preparation phase of the election cycle;
election information on the electronic display tag during an election phase of the election cycle;

post-election information on the electronic display tag during a post-election phase of the election cycle; and storage information on the electronic display tag during a storage phase of the election cycle.

22. The method of claim 20, further comprising securely communicating the subset of the information from the election equipment to the electronic display tag via a hard-wired connection.

* * * * *